United States Patent
Wolf

[15] 3,655,321
[45] Apr. 11, 1972

[54] APPARATUS FOR PRODUCING A HOLLOW HAMMER HANDLE WITH LONGITUDINALLY TENSIONED GLASS FIBERS

[72] Inventor: Wayne Wolf, Cedar Rapids, Iowa
[73] Assignee: Vaughan & Bushnell Mfg. Co., Hebron, Ill.
[22] Filed: Sept. 22, 1970
[21] Appl. No.: 74,447

Related U.S. Application Data

[62] Division of Ser. No. 817,805, Apr. 25, 1969

[52] U.S. Cl. .............................. 425/395, 425/116, 425/71, 425/305
[51] Int. Cl. .............................. B29c 3/00
[58] Field of Search ............... 18/DIG. 17, DIG. 53, 5 BA, 18/5 BJ, 5 BP, 5 BS, 5 BV, 5 BZ, 5 R, 16 R, 16 E, 16.5

[56] References Cited

UNITED STATES PATENTS

| | | | |
|---|---|---|---|
| 3,008,859 | 11/1961 | Smack | 18/5 R X |
| 3,164,646 | 1/1965 | Fischer | 18/5 BA X |
| 3,192,569 | 7/1965 | Knabel | 18/16.5 X |
| 3,390,429 | 7/1968 | Palmai | 18/16 R X |

*Primary Examiner*—H. A. Kilby, Jr.
*Attorney*—Norman H. Gerlach

[57] ABSTRACT

Molding apparatus for the production of two tandem-arranged hollow hammer handles having longitudinally tensioned fiber glass strands extending throughout their length. Upper and lower mold blocks, when brought together, define a mold cavity having open ends. Plastic-saturated fiber glass roving which is positioned in the mold cavity is pierced by a pair of mandrels which are projected into the mold cavity through such open ends to spread the glass fibers apart and establish within the handles voids which result from polymerization of the plastic material in the mold cavity.

4 Claims, 15 Drawing Figures

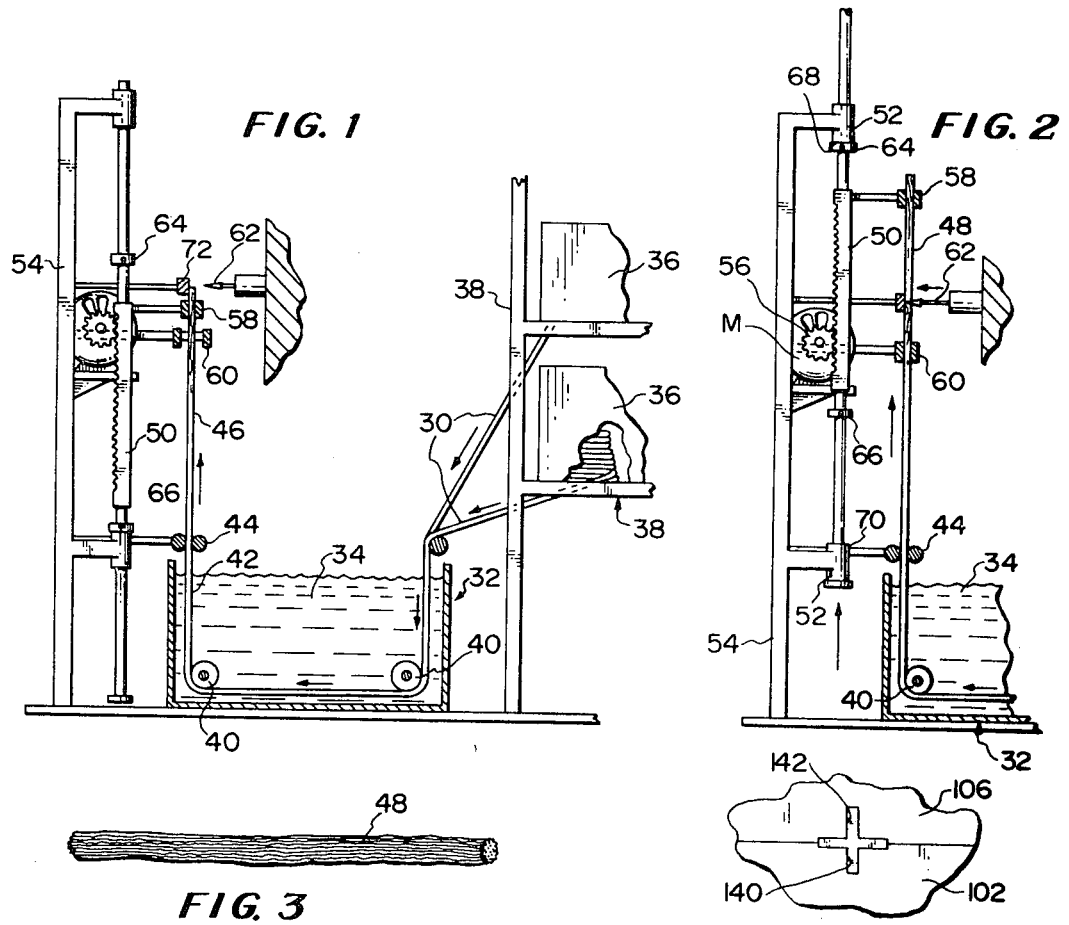
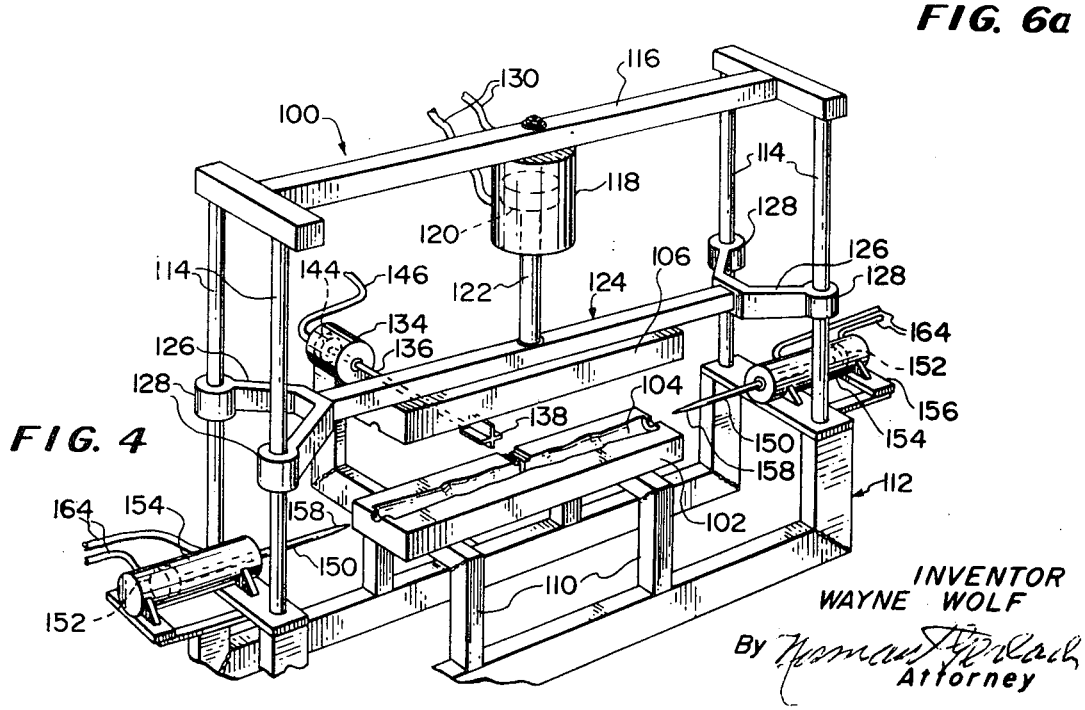

INVENTOR
WAYNE WOLF
By Norman Gerlach
Attorney

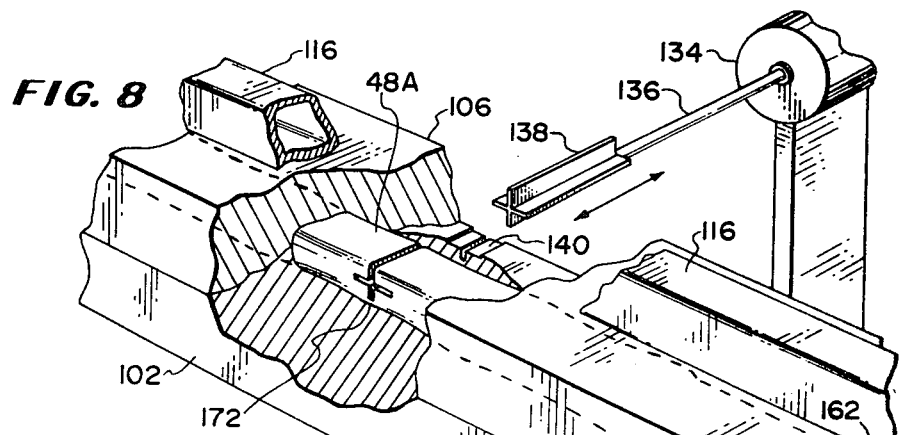
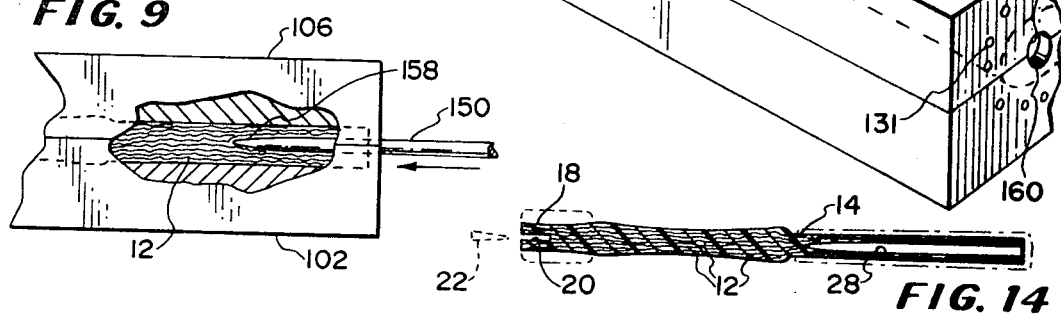
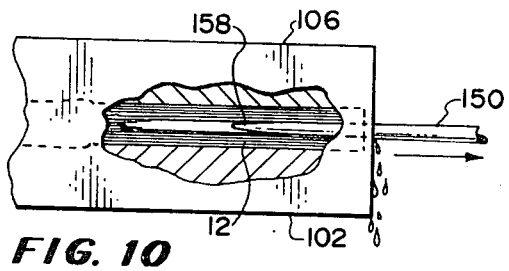
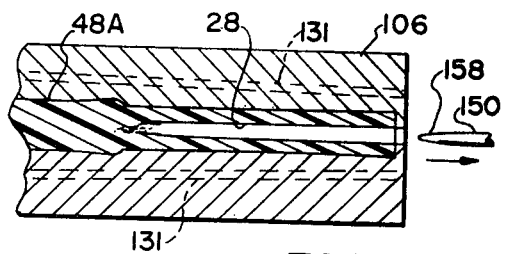
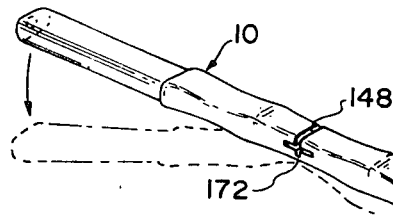
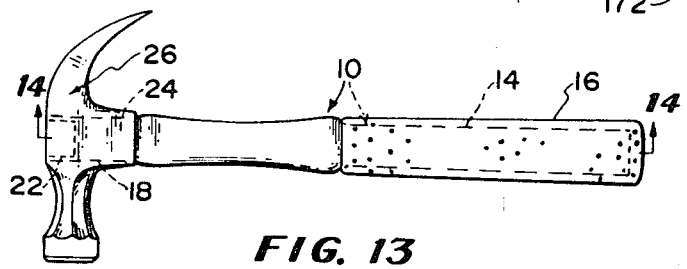
INVENTOR
WAYNE WOLF

APPARATUS FOR PRODUCING A HOLLOW HAMMER HANDLE WITH LONGITUDINALLY TENSIONED GLASS FIBERS

This application for United States Letters Patent is a division of my copending United States patent application Ser. No. 817,805, filed on Apr. 21, 1969 and now entitled "Hollow Hammer Handle with Longitudinally Tensioned Glass Fibers."

The present invention relates generally to a handle for a striking tool such as a hammer and has particular reference to a molding apparatus for producing a hollow fiber glass reinforced handle for such a tool.

Fiber glass reinforced hammer handles having longitudinally extending reinforcing glass fibers therein are well known in the art. Such handles, however, are solid throughout and the longitudinally extending glass fibers which are contained therein are not under tension and thus they are not necessarily linearly straight from one end thereof to the other. These handles, being solid, are of undue weight if correct hammer head weight and handle length and thickness are preserved. Considering a hammer head which weighs approximately 16 ounces (a long accepted standard for the head of an ordinary carpenter's claw hammer), a solid resin-impregnated fiber glass handle therefor having acceptable proportions comparable to those of a hickory handle will have an excess weight of several ounces, thus rendering the hammer as a whole unacceptable by a professional carpenter due to its lack of proper balance and its excess weight. In accordance with the apparatus of the present invention, by providing a hollow bore of predetermined length and volume, it is possible to construct a fiber glass hammer handle which meets the most exacting preferences of a carpenter as regards its size, shape and weight.

A hollow tubular fiber glass rod has heretofore been constructed and used as a handle for an impact tool, and more specifically as a golf club shaft. Such a rod, however, consists essentially of fiber glass cloth which is coiled about a mandrel with resin polymerization taking place while the cloth is on the mandrel. The fiber glass content of such a hollow rod is relatively small since only the spaced warp threads extend axially of the rod. Furthermore, these warp threads are not under tension so that they are not necessarily linearly straight. When wrapped from fiber glass tape in helical fashion, such threads are not continuous throughout the length of the rod. Finally, since such a rod is hollow throughout its entire length, i.e., is tubular from end to end, it is not suitable for use as hammer handle since the latter requires a solid section at least in the vicinity of the hammer head. Such a solid section is necessary not only to provide a reaction surface to absorb a misdirected blow of the hammer when the nail or other object being struck impinges against the handle in the vicinity of the head, but also to lend proper balance to the hammer as a whole. A hammer which is not properly balanced feels awkward in the hand of the experienced user and, in swinging the same, centrifugal and other forces are set up which give an unnatural feeling to the user just as an improperly balanced golf club or tennis racket feels awkward in the hand of an expert. One proper balance test which is commonly employed by a prospective purchaser of a conventional 16-ounce carpenter's claw hammer is to place the hammer head down on a flat level supporting surface, allowing the weight of the hammer to be borne on the curved surfaces of the claws near the base portions thereof so that the hammer assumes a rocking position with the handle extending upwardly at an angle with respect to the flat supporting surface. Then, if the hammer assumes a stable equilibrium, this is an indication of proper hammer balance. On the other hand, if the hammer assumes a degree of unstable equilibrium, this is an indication that the hammer is not properly balanced. A properly designed claw hammer having a solid hickory or other wooden handle is capable of passing such a test, but a claw hammer having either a solid or a completely tubular fiber glass handle is lacking in proper balance due to the greater density and weight of the impregnating material of the fiber glass and its lack of proper distribution throughout the handle.

The fiber glass hammer handle which is constructed by the present apparatus overcomes these limitations in that it affords a better distribution of the plastic impregnating material throughout the body of the handle, the region in the vicinity of the hammer head being solid while the region remote from the hammer head being tubular or hollow. The solid region thus is conducive toward proper balance and also affords a solid reaction area for assimilating the impact of a misdirected hammer blow. Furthermore, fiber glass strand distribution throughout the handle is more satisfactory since there is a denser grouping of the fiber glass strands than is the case where wrapped fiber glass cloth having warp and woof threads is concerned. This grouping of fiber glass strands also lends a certain amount of resiliency to the handle which is not possible where a great predominance of the solidified impregnating material exists and the relatively few glass fibers employed are widely spaced and not under longitudinal tension, or where they are overlapping and not continuous from one end of the handle to the other. Various other advantages of the present fiber glass hammer handle will become readily apparent as the nature of the invention is better understood from a consideration of the following detailed description.

Insofar as the apparatus of the present invention is concerned, the fashioning of two hammer handles in one molding operation with the handles being disposed in end-to-end relationship, as will be described in detail hereafter, is not only conducive toward facility and speed of the handle production, but affords certain functional advantages which are inherent in the completed handles themselves and which likewise will be described hereafter.

The handle-forming apparatus which is disclosed herein and forms a part of the present invention is merely one which is capable of practicing the method commercially on an economical basis and with facility, certain novel features being involved which enables the handles to be manufactured in quantity under the control of a single operator with a minimum amount of attention and without requiring special skills, the method which is carried out in connection with operation of the apparatus being conducive toward uniformity in the production of the handles.

The apparatus briefly outlined above consists in the several novel features which are hereinafter set forth with the apparatus being more particularly defined by the claims at the conclusion hereof.

In the accompanying three sheets of drawings forming a part of this specification, a completed hammer utilizing the fiber glass handle of the present invention, a novel method by means of which the handle may be formed, and an apparatus by means of which the method may conveniently be carried out are disclosed by way of exemplary illustration but not by way of limitation.

In these drawings:

FIG. 1 is a side elevational view, partly in section, of a fiber glass impregnation tank, together with associated apparatus and mechanism by means of which fiber glass roving is conducted through the tank, grouped into bundle form, and cut to length to produce hammer handle mold blanks;

FIG. 2 is a fragmentary view of a portion of the structure shown in FIG. 1, certain parts being shown in a different position;

FIG. 3 is a perspective view of one of the mold blanks;

FIG. 4 is a perspective view of a mold structure which is used in connection with the hereinafter described handle forming method and apparatus;

FIG. 6a is a fragmentary enlarged rear elevational view of the two mold blocks which are employed in connection with the invention, the blocks being in their closed position and the view serving to illustrate a certain entrance slot which is associated with the mold cavity in the mold structure;

FIG. 8 is a fragmentary enlarged perspective view, partly in section, showing the closed mold blocks and illustrating schematically the operation of the mold cavity divider which is employed in connection with the method and apparatus;

FIGS. 9 and 10 are fragmentary enlarged sectional views, partly in section, of a portion of the closed mold structure and illustrating, schematically, the manner in which the fiber glass strands are tensioned longitudinally during the molding operation;

FIG. 11 is a fragmentary enlarged sectional view taken longitudinally through one end of the closed mold blocks after the adjacent bore-forming, piercing mandrel has been withdrawn therefrom;

FIG. 12 is a perspective view of one of the polymerized dual-handle mold blanks after it has emerged from the mold blocks in the form of an integral dual-handle mold piece;

FIG. 13 is a side elevational view of a completed hammer employing one of the present fiber glass handles; and FIG. 14 is a sectional view taken on the line 14—14 of FIG. 13 with the hammer head removed in the interests of clarity.

Figure 5:
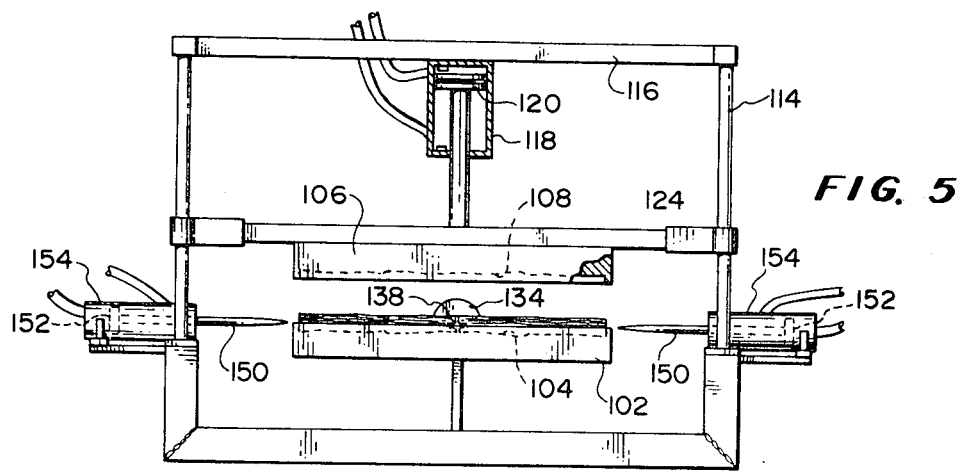
FIG. 5 is a fragmentary front elevational view of the mold structure of FIG. 4, showing the mold blocks in their open, blank-receiving position.

Referring now to the drawings in detail and in particular to FIGS. 13 and 14, a completed hammer handle assembly is designated in its entirety by the reference numeral 8 and consists of two principal parts, namely, a handle proper or shank 10 and a tubular handle grip 16. The present apparatus is concerned primarily with the construction of the handle proper or shank 10 and, therefore, throughout this specification, as well as in the appended claims, the handle proper or shank is referred to simply as the "handle" in the interests of brevity.

The handle 10 is formed in its entirety of a polymerized high strength thermosetting epoxy resin or the like within which there are embedded a large number of closely grouped glass filaments or fibers 12, all of which extend in the general longitudinal direction of the handle and which exist in the hardened resin under tension. The contour of the handle 10 closely follows the contour of a conventional metal or wooden hammer handle, the proximate end region or section of the same being of a reduced character as shown at 14 in order for reception thereover of the grip 16 which preferably is formed of rubber or other elastomeric material. A generally rectilinear section 18 at the distal end of the handle is provided with the usual slot 20 therein for reception of a wedge 22 by means of which the handle section 18 may be expanded and thus tightened within the socket 24 of a conventional steel carpenter's claw hammer head 26 or other impact device. A relatively deep tapered socket 28 extends inwardly from the proximate end face of the handle to a point substantially midway between the opposite ends of the handle, the diameter of the open rim of the socket being slightly less than the transverse width of the handle in its shortest transverse direction. Thus, the wall of the socket decreases gradually in thickness progressively in a forward direction and the socket terminating substantially in the vicinity of the forward end of the tubular handle grip 16. The remaining portion of the handle is solid except for the provision of the wedge-receiving slot 20.

The sectional illustration of the handle 10 in FIG. 14 is not to scale and it is not intended to be an exact sectional view. In this and other views, the particular fiber glass distribution is not entirely visible since the curing or polymerization process creates an essentially integral mass insofar as outward appearance is concerned, regardless of whether the view is an elevational or a sectional one. Only in FIGS. 9, 10 and 14 has an attempt been made to illustrate the fiber distribution.

Without giving consideration to any specific apparatus by means of which the handle 10 may be manufactured, and considering the handle-forming method in its broadest aspect, a handle such as the handle 10 may be manufactured by submerging the glass filaments or fibers in a bath of the uncured liquid resin which functions as a binder and then arranging the fibers in substantial contiguity and parallelism to provide an elongated mold blank in which the fibers extend in a longitudinal direction, after which the blank is placed in a heated mold by means of which liquid resin binder is polymerized. Prior to polymerization, a tapered mandrel is forcibly projected endwise into the filled mold in such a manner as to spread the longitudinally extending glass fibers radially outwardly and thus establish the aforementioned tapered socket in the handle undergoing molding. Prior to complete polymerization of the mold blank in the mold, the forcible projection of the mandrel endwise into the mold causes a longitudinal flow of the displaced resinous material rearwardly and outwardly from the entrance orifice for the mandrel, this flow being enhanced by the thixotropic property of the binder-forming liquid resinous material which, upon initial absorption of heat, attains a greatly lowered coefficient of viscosity. The flow of the liquid resinous material is, therefore, relatively rapid yet the material retains sufficient tenacity with respect to the longitudinally extending fibers as literally to pull them rearwardly and tension them so that they become more truly linearly straight. As this thixotropic property of the resinous material diminishes and the material gradually sets or hardens, the fibers remain in tension until they are fixedly encased in the hardened and completely polymerized binder-forming material. This introduction of the mandrel also creates a greater fiber density in the wall of the socket 28 than in the solid distal section 18 of the handle undergoing molding but the escape of some of the resinous material as heretofore described renders the hollow proximate end section of the handle somewhat lighter than the solid distal section 18, this feature contributing toward proper balance when the completed handle is applied to the hammer head 26. An insert at the far end of the mold remote from the mandrel establishes in the molded handle a conventional wedge slot by means of which the handle may be secured in the eye 24 of the hammer head 26.

Referring now to FIGS. 1 to 4, inclusive, a novel apparatus for practicing the method of forming the handle is shown. FIGS. 1 and 2 illustrate in a schematic manner a convenient method and apparatus by means of which fiber impregnation and grouping to produce a mold blank of the character shown in FIG. 3 may be attained, while FIG. 4 shows a molding apparatus whereby a tandem arrangement consisting of two united, yet readily separable, hammer handles may be produced from the single mold blank of FIG. 3.

For convenience of description herein, the apparatus of FIGS. 1, 2 and 4 will not be described in detail, a description of the method as conducted by such apparatus being considered adequate to afford an adequate understanding thereof. Specific designation of the various elements, assemblies of elements, and parts of certain elements will be made only insofar as they contribute toward the performance of functions undergoing discussion.

Referring now specifically to FIG. 1, the aforementioned impregnation or coating of glass fibers is conveniently carried out by pulling continuous lengths or strands of fiber glass roving 30 through a submersion tank 32 containing a column or body 34 of the binder-forming liquid resinous material. The particular material which is employed may be any suitable low pressure thermosetting resin such as the polyester resin which is sold commercially by Archer-Daniels-Midland Co. of Minneapolis, Minn. under the trade designation "Q-6140," while the fiber glass roving may be purchased in spool form from Gustin-Bacon Co. of Kansas City, Mo. under the trade designation "Ultra Strand." Each strand of roving consists of approximately 212 separate filaments of glass twisted together to produce one twist turn per inch although various other forms of fiber glass roving may be found suitable for use in connection with the present invention. The specific number of strands of roving which are pulled through the submersion tank 32 may also be varied but satisfactory results are obtained when 130 such strands are employed. The roving is furnished in paperboard cartons 36 having discharge openings from which the strands may issue, and as shown in FIG. 1 the requisite number of cartons are stored on shelving 38 in the vicinity of the submersion tank 32. The roving 30, as it passes through the tank 32, is maintained in a submerged condition by submerged rollers 40 at opposite ends of the tank. After passing through the tank 32, the roving strands pass upwardly as indicated at 42 and are caused to converge and pass through an annular gathering die 44 where they are grouped into bundle form while at the same time a squeegee action is exerted on the strands to return excess binder-forming material to the tank 32 and also to compact the roving strands 30, while at the same time excluding entrained air from the strands. As the result of the squeezing action of the die 44, the strands are caused to form a generally cylindrical semi-rigid bundle as indicated at 46. The liquid resinous material is extremely tacky so that good adherence is attained in the bundle 46.

The pulling of the strands of roving 30 through the submersion tank 32 is effected in intermittent fashion, each pulling cycle serving to produce a bundle having a length equal to the length of one of the mold blanks 48 of FIG. 3. Pulling of the roving may be effected by a wide variety of mechanisms, but for exemplary purposes, such pulling is accomplished by means of a vertically reciprocable rack 50 which is slidable in guide members 52, the latter being suitably carried in spaced relationship on a fixed standard 54. A suitable reversible motor M with manual controls (not shown) serves to drive a pinion 56 which meshes with the rack 50 for the purpose of raising and lowering the same. A pair of vertically movable clamping jaws 58 is carried by and movable with the rack 50. The jaws 58 are normally open but are adapted, upon closing thereof, to engage the upper portion of the bundle 46 of roving for pulling purposes during movement of the rack from the lowered position in which it is shown in FIG. 1 to the raised position wherein it is shown in FIG. 2. A similar pair of fixed clamping jaws 60 is supported from the standard 54 and these jaws are likewise adapted upon closing thereof to engage the lower portion of the bundle 46 of roving. Each pulling operation is carried out by closing the jaws 58 and causing them to engage the bundle of roving 46 when the rack 50 is in its lowered position, and then energizing the motor M in such a manner as to move the rack to its raised position, after which the jaws 60 are caused to become closed. At this time, both pairs of jaws are closed upon the bundle of roving so that upon actuation of a cutter element 62, one of the mold blanks 48 is severed from the bundle 46. The upper and lower positions of the rack 50 are determined by the provision of two stop collars 64 and 66 which are fixedly mounted on the rack and are engageable with fixed shoulders 68 and 70 on the standard 54. The cutter element 62 is adapted to be actuated immediately after the rack 50 reaches its upper position, the cutter element cooperating with an anvil block 72 to sever the bundle 46 and leave the severed portion or mold blank 48 suspended from the upper clamping jaws 58. Upon opening of these latter jaws, the mold blank 48 may be removed and conducted to the molding apparatus which is shown in FIG. 4. As soon as the mold blank 48 has been thus removed, the lower clamping jaws 60 may be opened preparatory to returning the rack 50 to its lowered position for a repetition of the pulling process.

Referring now to FIG. 4 wherein there is disclosed an exemplary form of molding apparatus 100 which is capable of producing the hammer handles 10 includes a fixed lower mold block 102 of upright tray-like design and having a mold depression 104 is designed for cooperation with a movable upper mold block 106 of inverted tray-like design and having a mold depression 108. The mold block 102 is mounted on two supports 110 which are associated with a frame structure 112. A pair of guide rods 114 projects upwardly at each end of the frame structure 112 and serves to support an elevated superstructure 116 to which there is secured a fluid cylinder 118 which may be either of the pneumatic or hydraulic type. The cylinder is provided with a reciprocable piston 120 from which there depends a plunger 122, the lower end of the plunger serving to support a vertically reciprocable carriage 124 having yokes 126 at the ends thereof. Said yokes are provided with sleeves 128 which are slidable on the guide rods 114. The carriage 124 serves operatively to support the upper mold block 106 in effective vertical register with the fixed lower mold block 102. The cylinder is operatively connected through a pair of fluid lines 130 to a source of fluid under pressure, suitable valve means (not shown) being interposed in the lines 130 for controlling the flow of motive fluid to and from the cylinder for piston-moving purposes. Electric resistance elements 131 (FIG. 11) or the like extend variously through the mold blocks, and during any given mold run, they may remain continuously energized to maintain the mold blocks at the desired curing temperature.

Figure 6:
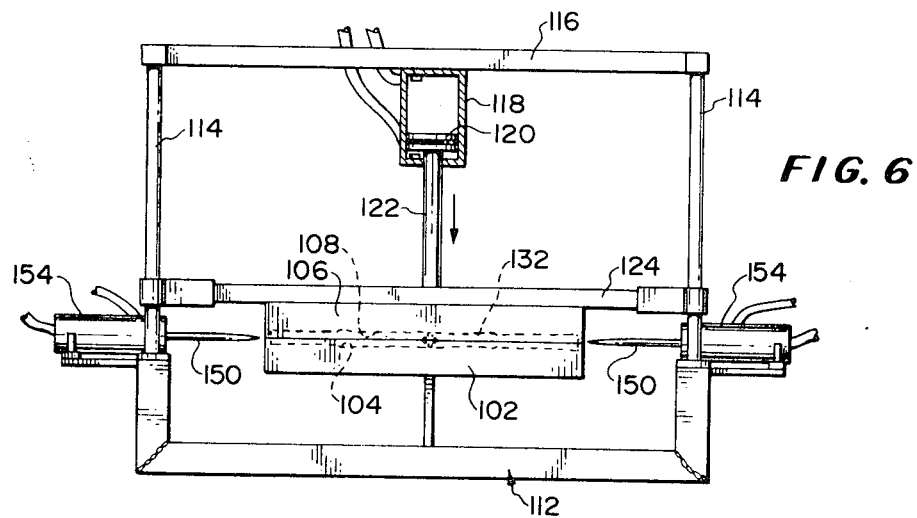
FIG. 6 is a front elevational view similar to FIG. 5 but showing the mold blocks in their closed position preparatory to insertion thereinto of two bore-forming, piercing mandrels which are employed in connection with the method and apparatus.
Figure 7:
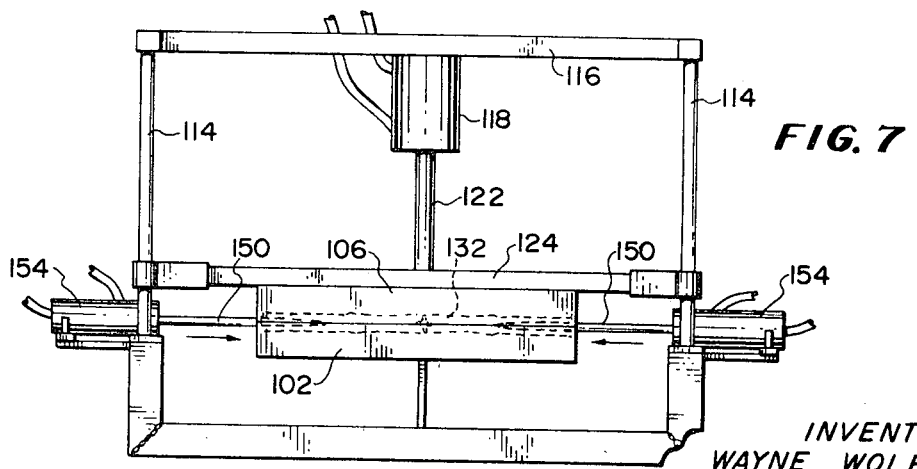
FIG. 7 is a front elevational view similar to FIGS. 5 and 6 but showing the bore-forming, piercing mandrels projected into the filled mold structure.

The two mold depressions 104 and 108 are complementary counterpart depressions so that when the upper mold block 106 is lowered into engagement with the lower mold block 102 and forcibly held thereagainst, the depressions 104 and 108 define therebetween a mold cavity 132 (see FIGS. 6 and 7) having a contour which conforms generally to the outer contour of a pair of the hammer handles 10 when the latter are disposed in tandem end-to-end relationship with their distal end sections 18 in abutting relationship. A second cylinder 134 is suitably mounted on the frame structure 112 and embodies a plunger 136 the outer end of which serves to support a generally X-shaped mold blank divider element 138. The latter is adapted to be projected transversely into the confines of the mold cavity 132 when the mold blocks 102 and 106 are closed upon each other. To accommodate such projection of the X-shaped divider element 138 into the cavity 132, a pair of complementary slots 140 and 142 (see FIGS. 6a and 8), each of which is of T-shape design, is formed in the rear walls of the mold blocks 102 and 106 and are adapted, when the mold blocks are in their closed position, to establish an X-shaped opening to accommodate projection of the divider element 138 into the mold cavity. As shown in FIG. 8, the upper vertical blade of the X-shaped divider element 138 is of slightly greater radial extent than the lower vertical blade, this discrepancy in size serving a purpose that will be made clear presently when the operation of the molding apparatus is et forth. The cylinder 134 is provided therein with a piston 144 which is operatively connected to the plunger 136 and is spring-biased to a retracted position so that the plunger and divider element 138 normally assume the retracted position in which they are shown in FIG. 4. Motive fluid is adapted to be supplied to the cylinder 134 through a conduit 146 and, when so supplied, the piston and plunger are projected forwardly so that the divider element 138 enters the mold cavity 132 through the registering T-shaped slots 140 and 142. As will be set forth in greater detail presently, the divider element 138 is provided for the purpose of creating in the uncured mold block 48 a transverse X-shaped relief area 148 (see FIG. 12) which not only facilitates ease of separation of the mold blank into two substantially finished hammer handles 10, but which also establishes in these handles the aforementioned wedge-receiving slots 20.

The aforementioned tapered sockets 28 in the handles 10 are, as previously outlined, created by projection mandrels into the closed and filled mold structure consisting of the two mold blocks 102 and 106. Accordingly, the molding apparatus 100 of FIG. 4 embodies a pair of such mandrels 150, these mandrels being secured to pistons 152 which are reciprocable in respective cylinders 154, the latter being mounted on outrigger platforms 156 which are carried by the frame structure 112 of the apparatus 100. The outer ends of the mandrels 150 are tapered as indicated at 158 and the mandrels are adapted to be projected through semi-circular registering openings 160 and 162 in the end walls of the mold blocks 102 and 106 as shown in FIG. 8 when the two mold blocks are in their closed position. Fluid lines 164 are provided for actuating the cylinders 154 and may have interposed therein suitable control valves (not shown) by means of which fluid under pressure is selectively directed to the cylinders. When the mandrels 150 are in their retracted position as shown in FIGS. 4, 5, 6 and 11, they remain wholly outside the confines of the mold cavity 132. When the mandrels are in their projected positions as shown in FIGS. 7, 9, 10 and 11, the forward or outer tapered ends 158 thereof project into the mold cavity through the registering openings 160 and 162.

Considering now the molding of one of the blanks 48 by the molding apparatus 100 of FIG. 4, the blanks which are severed from the bundle 46 of roving strands 30 are substantially at room temperature and they are relatively tacky. The severing operation releases a mold blank which is substantially equal to the length of the mold depression 104 and which, in volume, is substantially equal to the volume of the mold cavity 132. This mold blank is placed in the depression 104 and, thereafter, the cylinder 118 is actuated to move the upper mold block 106 downwardly into engagement with the lower mold block 102, thus establishing the mold cavity 132 which now is substantially completely filled with the mold blank 48. The electric resistance elements 132 maintain both mold blocks at the desired curing temperature so that the curing process commences as soon as the mold blank assumes its position in the closed mold structure.

Immediately after the mold structure has been closed as set forth above, the cylinders 152 are actuated to project the mandrels 150 through the registering openings 160 and 162. During such projection, the tapered end regions 158 of the mandrels penetrate the end regions of the mold blank 48 and progressively spread the fibers of the roving strands 30 radially outwardly and compress these strands, together with the uncured binder-forming resinous material, against the wall of the mold cavity 132 in those regions of the mold blank where the hollow portions of the handles 10 are to be formed. As the two mandrels 150 progress endwise into the mold cavity, and since the cavity is substantially full prior to entrance of the mandrels, a limited quantity of the liquid resinous material is extruded from the registering openings 160 and 162, while at the same time the forward projection of the mandrels exerts a high compression on the fiber and binder materials near the central region of the mold cavity. Due to the thixotropic property of the epoxy resinous material, an almost immediate softening or reduction in the viscosity of the binder-forming material takes place as heat is absorbed so that there is a relatively rapid backward flow of the binder-forming material alongside the mandrels 150. This flow of liquefied binder-forming material causes a tensioning in the glass fibers which surround the mandrels while the fibers in the medial region of the mold cavity in between the mandrels remain compacted in the dense portion of the binder-forming material.

It is not necessary to maintain the mandrels 150 fully projected within the mold cavity until complete polymerization has taken place. As soon as the binder-forming material has become self-supporting so that it will not run and thus destroy or deform the tapered smooth bore sockets 28 which are occasioned by the presence of the mandrels in the mold cavity 132, the mandrels are withdrawn and the cylinder 118 is actuated to raise the upper mold block 106 and thus expose the completed and cured molded piece 48A.

Prior to complete polymerization of the binder-forming resinous material of the mold blank 48, either immediately after initial closing of the mold blocks 102 and 106 upon each other and before the mandrels 150 have been projected, or after the mandrels have been either partially or fully projected, the cylinder 134 is actuated to project the divider element 138 through the registering slots 140 and 142 (see FIG. 8) and into the mold cavity 132. This projection of the divider element effects a slicing of the uncured mold blank and produces in the finished molded piece 48A a transversely extending X-shaped slot 170 (see also FIG. 12) wherein the two hammer handles 10 are joined together by a thin web 172 which exists by reason of the fact that the lower vertical blade of the divider element 138 is shorter than the upper vertical blade and does not touch the bottom wall of the mold cavity 132.

Elevation of the upper mold block 106 exposes the completed molded piece 48A so that the same may be lifted from the mold depression 104 in the lower mold block 102. If desired, the dual handle molded pieces 48A may be packaged and shipped to the consumer or hammer manufacturer as integral units for subsequent separation of the two handles 10 from each other or, alternatively, separation may be effected by the operator of the molding apparatus and the handles 10 packaged for shipment as individual units. Separation is readily effected as indicated in dotted lines in FIG. 12 by the simple expedient of bending the molded piece 48A so as to break the web 172. The flashing created by rupture of the web 172, together with any other existing flashing resulting from the molding operation, may be trimmed from the handles 10 prior to their being put to use.

The invention is not to be limited to the exact arrangement of parts shown in the accompanying drawings or described in this specification since various changes in the details of construction may be resorted to without departing from the scope of the invention. Therefore, only insofar as the invention has particularly been pointed out in the accompanying claims is the same to be limited.

Having thus described the invention what I claim as new and desire to secure by letters patent is:

1. Molding apparatus for the production of a pair of tandem-arranged and substantially complete hammer handles having their distal ends disposed in substantial contiguity, said apparatus comprising a fixed lower mold block having a mold cavity depression therein, a vertically movable upper mold block likewise having a mold cavity depression therein, means for moving said upper mold block between a raised open-mold position and a lower closed-mold position wherein said depressions are in register with each other and produce an elongated horizontal mold cavity of a shape conformable to the shape of said tandem-arranged handles, means for heating said mold blocks, a pair of horizontally movable tapered mandrels in horizontal alignment with the mold cavity at the opposite ends of the latter and movable between retracted positions wherein they are disposed exteriorly of the mold cavity and advanced positions wherein they project an appreciable distance into the mold cavity from the opposite ends thereof, said cavity being adapted for the reception of a mold blank consisting of a thermosetting binder having a large multiplicity of continuous binder-entrained glass fibers therein whereby projection of the mandrels into the mold cavity will spread the binder and its entrained fibers radially outwardly and compress the same against the wall of the mold cavity and thus produce relatively deep sockets in the opposite ends of the mold blank, and means for moving said mandrels between their retracted and their advanced positions.

2. Molding apparatus as set forth in claim 1 and including, additionally, a cutter blade mounted for movement in a path which intersects the longitudinal axis of the mold cavity at its midpoint, said cutter blade being movable between a retracted position wherein it is disposed exteriorly of the mold cavity and a retracted position wherein it traverses the mold cavity and substantially divides the mold blank therein into two mold pieces each of which represents one of said hammer handles, and means for moving said cutter blade.

3. Molding apparatus as set forth in claim 2 and wherein said cutter blade is of X-shape in transverse cross section and is movable in a horizontal path into and out of the mold cavity whereby one pair of aligned cutter blades effects said mold blank division while the other pair of aligned cutter blades produces wedge slots in the adjacent ends of the substantially divided mold pieces.

4. Molding apparatus as set forth in claim 3 and wherein one of the aligned cutter blades which effects the mold blank division is of such radial extent that it substantially intersects the wall of the cavity, while the other blade which is aligned therewith is of lesser radial extent whereby the mold pieces remain joined together by a thin web.

* * * * *